United States Patent [19]
Lyons et al.

[11] Patent Number: 5,118,229
[45] Date of Patent: Jun. 2, 1992

[54] APPARATUS FOR TRANSMITTING MOTION TO AN OFF-AXIS ROTARY DRIVEN TOOL

[75] Inventors: Alan C. Lyons, Raleigh; James A. Oshnock, Garner, both of N.C.

[73] Assignee: Kennametal Inc., Labrobe, Pa.

[21] Appl. No.: 710,210

[22] Filed: Jun. 4, 1991

[51] Int. Cl.⁵ .......................... B23C 5/26; B23C 7/00
[52] U.S. Cl. ................................. 409/144; 409/215; 409/233
[58] Field of Search ............... 409/144, 215, 233, 232; 83/698; 279/75; 408/239 R, 239 A, 240

[56] References Cited

U.S. PATENT DOCUMENTS

| | | | |
|---|---|---|---|
| 3,323,419 | 6/1967 | Riedel | 409/233 |
| 4,244,666 | 1/1981 | Erickson et al. | 407/105 |
| 4,586,860 | 5/1986 | Ohkoshi et al. | 409/233 |
| 4,677,719 | 7/1987 | Link | 409/233 X |
| 4,708,040 | 11/1987 | Erickson | 82/36 B |
| 4,729,700 | 3/1988 | Herbel et al. | 409/144 |
| 4,758,122 | 7/1988 | Kubo | 409/233 |
| 4,932,295 | 6/1990 | Erickson | 82/160 |

FOREIGN PATENT DOCUMENTS

| | | |
|---|---|---|
| 0383735 | 8/1990 | European Pat. Off. |
| 3635910 | 10/1986 | Fed. Rep. of Germany |
| 8616485 | 12/1986 | Fed. Rep. of Germany |
| 0013074 | 1/1979 | Japan .................... 83/698 |

Primary Examiner—Z. R. Bilinsky
Attorney, Agent, or Firm—James G. Porcelli

[57] ABSTRACT

An apparatus is provided for transmitting rotation about and translation along a first axis from a driver to a toolholder with a spindle along an axis non-parallel from the first axis. A shaft is rotatably mounted within a sleeve which is slidably mounted within a bore along the first axis. The sleeve has an inclined surface at one end which when the sleeve is translated engages an interface member to provide displacement.

16 Claims, 4 Drawing Sheets

APPARATUS FOR TRANSMITTING MOTION TO AN OFF-AXIS ROTARY DRIVEN TOOL

BACKGROUND OF THE INVENTION

The present invention relates to an apparatus for transmitting rotation about and translation along a first axis to a second axis and more specifically an apparatus for rotating a rotary driven tool with a driver oriented along an axis different from that of the rotating tool spindle and for transmitting translation for release of the toolholder within the spindle of a rotary driven tool.

A lathe is a machine tool for shaping an article of metal by holding and turning the article rapidly against the edge of a cutting tool. Typically, lathes used in a production environment contain a large number of cutting tools with each tool at a specific station on the lathe and capable of being indexed to a location to perform a cutting operation. In the past these cutting tools have been static while the workpiece rotates about the tool. Recent advances in machine tool technology have made it possible for the cutting tool to move relative to the workpiece is desired. A cutting tool mounted to a lathe and simultaneously capable of rotation is known in the art as a driven or motivated tool.

Figure 1:
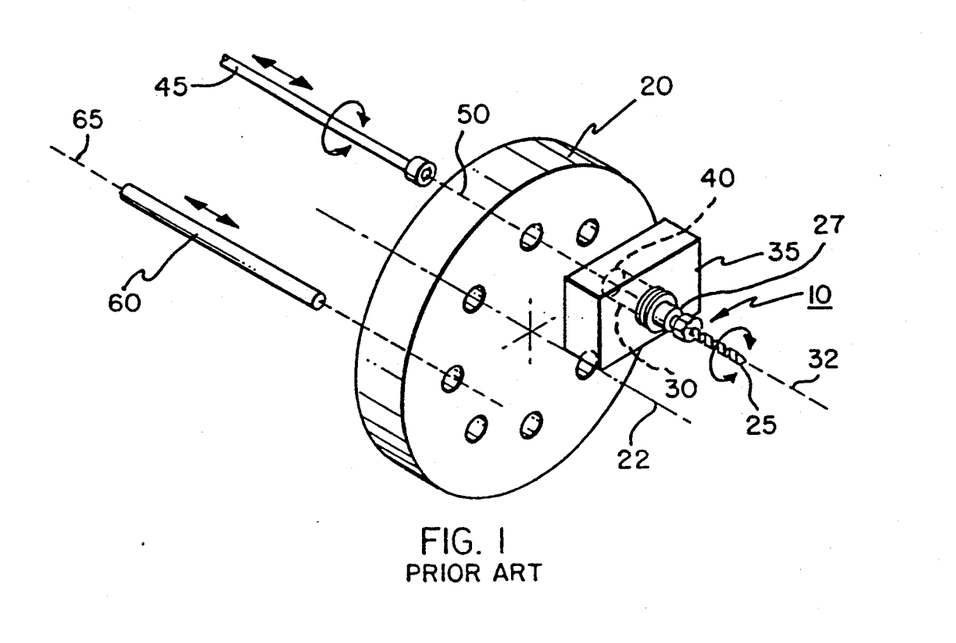
FIG. 1 is prior art and illustrates an isometric view showing a driven tool housing mounted upon a turret lathe disc for rotating a toolholder within a spindle which is in line with the driver and pusher.

As an example of such a device, FIG. 1 illustrates a driven tool 10 mounted to a turret lathe disc 20 which may rotate about a turret lathe disc axis 22. The driven tool 10 is generally comprised of a cutting element 25, in this case a drill bit, secured to a toolholder 27 within a spindle 30 which is secured within a driven tool housing 35. The spindle rotates about a spindle axis 32. The driven tool housing 35 is secured to the turret lathe disc 20, however, generally the spindle 30 extends through a turret lathe disc receiving hole 40 which is one of many receiving holes about the circumference of the disc 20. A driver 45 along a driver axis 50 may be advanced to the turret lathe disc receiving hole 40 to engage the spindle 30 thereby causing rotation of the toolholder 27 and cutting element 25.

While the driven tool housing 35 remains attached to the disc 20, it is possible to rotate the disc 20 about the turret lathe disc axis 22 so that the receiving hole 40 is aligned with a pusher 60 along a pusher axis 65. Typically, a toolholder 27 is mounted within a spindle 30 in a releasable manner such that the toolholder 27 may be quickly released or secured. Such an arrangement may involve a translational motion directed to the spindle 30. It can then be seen that if the turret lathe disc 20 were rotated such that the driven tool housing 35 and the associated receiving hole 40 were aligned with the pusher axis 65, then the pusher 60 could be advanced to release the toolholder 27 so that a different toolholder could be inserted into the spindle 30. While FIG. 1 shows only a single housing 35 associated with a single receiving hole 40, the turret lathe disc 20 may have a plurality of housings such that each receiving hole 40 could be occupied by a spindle 30 of an associated housing 35.

Two such examples of a driven tool in which the driver and the pusher are coaxial to the spindle axis are found in U.S. Pat. No. 4,758,122 by Kubo issued Jul. 19, 1988 entitled "Tool Clamping Apparatus" and European Patent Application Number 90850031.7, Publication Number 0383735 A2 published Aug. 22, 1990 entitled "Tool Clamping Device."

Figure 2:
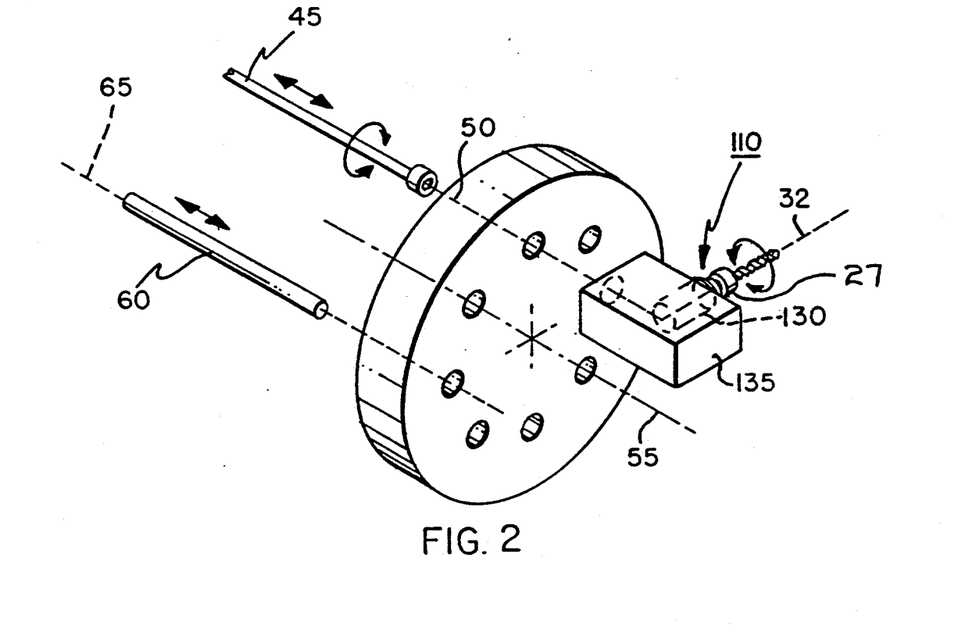
FIG. 2 illustrates an isometric view showing a driven tool housing mounted to a turret lathe disc for rotating a toolholder within a spindle about an axis different than that axis of the driver or pusher.

FIG. 2 shows an arrangement in which the spindle 130 within the housing 135 of the driven tool 110 is along an axis 32 which is not parallel to the driver axis 50 or the pusher axis 65. Through a gearing arrangement such as two beveled gears at 90 degrees to one another, it may be possible to transmit the rotation of the driver 45 to the spindle 130. However when the driven tool housing 135 is indexed such that the turret lathe disc receiving hole 40 is aligned with the pusher axis 65, the manner in which the pusher 60 releases the toolholder 27 is not obvious. It should be noted that a single disc receiving hole 40 is typically the only access to the driven tool housing 35 available for both driving the tool and for releasing the toolholder 27.

Driven tool arrangements in which the axis of the driver are different from that of the spindle axis may be found in German Patent DE 3635910 A1 published Jun. 04, 1987 and German Patent DE 8616485-U1 published Dec. 18, 1986; however, these designs utilize gearing arrangements to drive the spindle and to release the toolholder from the spindle and as a result involve coupled gearing interaction. Furthermore, the toolholder is released through gearing utilizing a rotational motion.

It is an object of this invention to provide an apparatus of a fairly simple design that may be utilized to provide off-axis rotation and translation to a driven tool from along a single axis.

It is a further object of this invention to provide an apparatus for transmitting rotation and translation to an off-axis spindle through the single receiving hole associated with the driven tool mounted on a turret lathe disc.

SUMMARY OF THE INVENTION

The present invention claims an apparatus for transmitting rotation about and translation along a first axis from a driver to a toolholder within a spindle positioned along a second axis and having a toolholder translational locking mechanism. The apparatus is comprised of a housing having a first bore along the first axis and a second bore along the second axis, wherein the second bore is adapted to receive the spindle, a sleeve having a first and second end and the sleeve slidingly mounted for translation along the first axis within the first bore, means for transmitting translation of the sleeve to translation along the second axis for operating the toolholder translational locking mechanism, a shaft having a first and second end rotationally mounted within the sleeve, and means for transmitting rotation of the shaft about the first axis to rotation about the second axis for rotating the spindle thereby rotating the toolholder.

In one embodiment the means for transmitting translation of the sleeve to translation along the second axis for operating the toolholder translational locking mechanism is comprised of a ramped surface within and secured to the housing oriented away from the first axis and an interface member within the housing which when moved by the sleeve second end engages the ramped surface and is guided away from the first axis to provide translation to a translation conveyor means which acts upon the toolholder locking mechanism of the spindle.

In another embodiment the means for transmitting translation of the sleeve to translation along the second axis for operating the toolholder translational locking mechanism is comprised of the sleeve further including a ramped surface at the sleeve second end oriented away from the second axis. The means for transmitting translation of the sleeve is comprised of an interface member guided within the housing away from the first axis and capable of being engaged with the sleeve ramped surface to provide translation to a translation conveyor means which acts upon the toolholder locking mechanism of the toolholder.

The translation conveyor means may have at least three embodiments. First of all the translation conveyor means may be comprised of a series of adjacent spheres captured and guided within a channel in the housing. The channel is approximately aligned with the guided interface member at one end and with the toolholder locking mechanism at the other end such that the translation of the sleeve is transmitted to translation at the toolholder locking mechanism.

Secondly, the translation conveyor means may be comprised of a series of adjacent spheres captured and guided within a channel in the housing The channel is approximately aligned with the guided interface member at one channel end and with one end of a pivoting arm mounted within the housing at the other channel end. The other end of the pivoting arm may be approximately aligned with the toolholder translational locking mechanism, such that translation of the sleeve is transmitted to translation at the toolholder locking mechanism.

Thirdly, the translation conveyor means may be comprised a sealed fluid filled line secured to the housing. The line has sliding pistons at each end with one piston approximately aligned with the guided interface member and the other piston approximately aligned with the tool release, such that translation of the sleeve is transmitted to translation at the toolholder locking mechanism.

The means for transmitting rotation of the shaft about the first axis to rotation about the second axis for rotating the spindle thereby rotating the driven tool may be comprised of an external spline about the second end of the shaft, a pinion gear rotationally mounted within the housing along the first axis near the second end of the shaft, the pinion gear having an inner diameter with an internal spline to slidingly receive the external spline, and a driven gear secured to the spindle along the second axis and engaged with the pinion gear such that rotation of the pinion gear will cause rotation of the spindle and cutting element.

BRIEF DESCRIPTION OF THE DRAWINGS

The foregoing and other aspects of the present invention will become more apparent upon review of the following detailed description of the invention in conjunction with the drawings which are briefly described below.

DETAILED DESCRIPTION OF THE INVENTION

Figure 3:
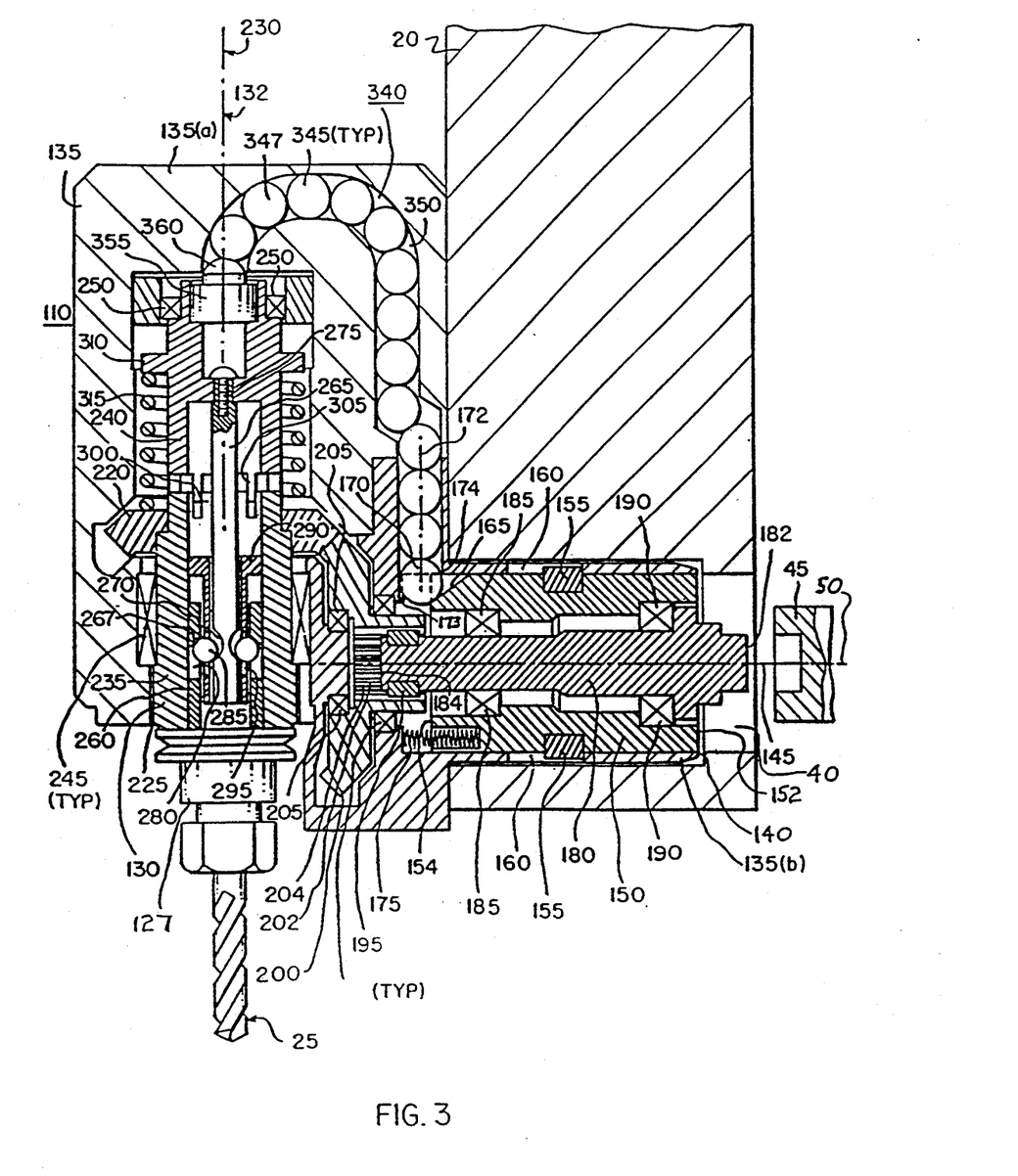
FIG. 3 shows a plan view of an embodiment of the apparatus in accordance with the present invention in partial cross-section with the toolholder secured to the spindle in the driven tool housing.

FIG. 3 provides details of the driven tool housing 135 and the driven tool 110 found in FIG. 2. Note the housing 135 is shown as items 135(a) and 135(b) to illustrate two separate portions of housing 135, however the driven tool housing will be referred to generally as item 135. The housing portions 135(a) and 135(b) are secured to one another through conventional means such as bolted connections between portions 135(a) and 135(b). The driven tool housing 135 is mounted to the turret lathe disc 20 through conventional means, such as a bolted connection between the housing 135 and the disc 20, and extends through a turret lathe disc receiving hole 40. A first bore 140 extends through the housing 135(b) along a first axis 145. Just as in FIG. 2, the turret lathe disc 20 may be indexed such that the first axis 145 is coaxial with either the driver axis 50 of the driver 45 or the pusher axis 60 of the pusher 45 (not shown).

A sleeve 150, having a sleeve first end 152 and a sleeve second end 154 is slidingly mounted for translation along the first axis 145 within the first bore 140. The sleeve 150 may also be restricted from rotating about driver axis 50. This may be done by attaching keys 155 to th sleeve 150 that may travel within slots 160 in the tool housing 135(b).

At the sleeve second end 154 is a ramped surface 165 oriented outwardly from the sleeve second end 154 for engaging an interface member 170 which is guided away from the first axis 145 along a translational axis 172. The angle the ramped surface 165 makes with the translational axis 172 may be approximately between 50 to 60 degrees and is preferably approximately 55 degrees.

In the alternative, the sleeve 150 may have a flat or blunt surface (not shown) at the sleeve second end 154 in place of the ramped surface 165 shown in FIG. 3. In this embodiment the ramped surface 165 would be parallel with the translational axis 172. However in order to provide displacement along the translational axis 172, the housing 135 at 173 would be extended toward the sleeve first end 152 and have a ramp formed on the extension that would resemble a mirror image of the existing ramped surface 165 in FIG. 3. In such a way, the sleeve 150 would displace the interface member 170 along the ramped surface to produce deflection along the translational axis 172. Corner 174 of the housing 135 would be altered to permit the interface member 170 to pass within the housing 135. In this instance, the angle the housing ramped surface (not shown) would make with the translational axis 172 could be approximately between 50 and 60 degrees and preferably would be 55 degrees. When sleeve 150 is advanced within the first bore 140, the ramped surface 165 engages the interface member 170 to displace the member 170 along the translational axis 172 and provide translation that will be directed to the toolholder locking mechanism of the spindle 130. A spring 175 may be mounted between the housing 135 and the sleeve 150 to urge the sleeve 150 to its neutral position, shown in FIG. 3.

Returning to the embodiment shown in FIG. 3, a shaft 180 having a shaft first end 182 and a shaft second end 184 is rotationally mounted within the sleeve 150 using bearings 185 and 190. In this manner, the shaft 180 may freely rotate within the sleeve 150 about the first axis 145 and, furthermore, may translate with the sleeve 150 within the bore 140 along the first axis 145.

Figure 4:
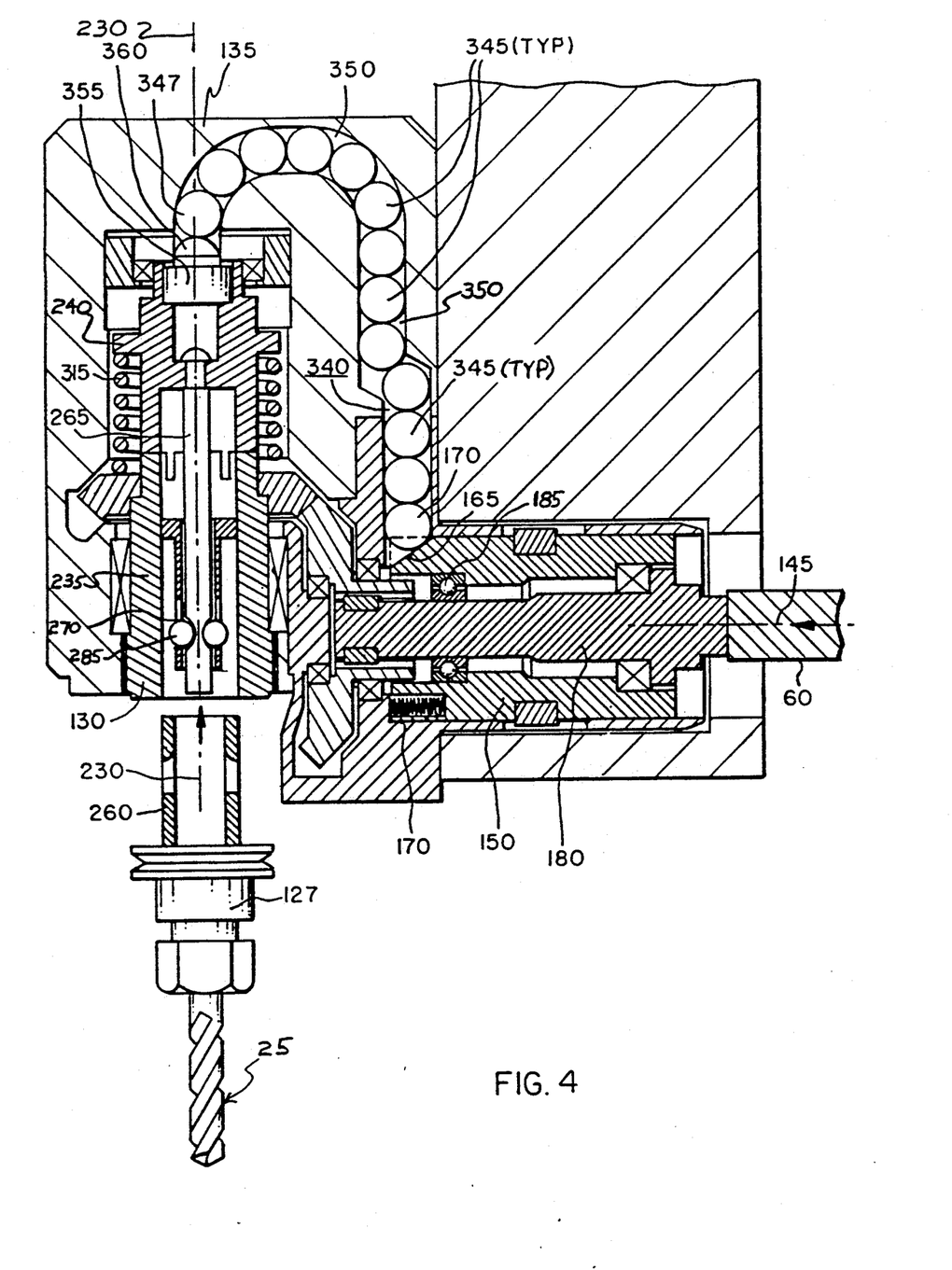
FIG. 4 shows a plan view of an embodiment of the apparatus in accordance with the present invention in partial cross-section with the toolholder released from the spindle in the driven tool housing.

The bearings 185 and 190 shown in FIG. 3 may be of the type shown as item 185 in FIG. 4. Other bearings will be mentioned throughout this discussion and it should be appreciated that the bearing detail shown as item 185 in FIG. 4 may be representative of these bearings.

A pinion gear 200 is rotationally mounted within the housing 135 along the first axis 145 near the shaft second end 184 by bearings 205 and 206. The shaft 180 rotationally engages the pinion gear 200 but is free to move longitudinally relative to the pinion gear 200. This may be accomplished with an external spline 195 about the shaft 180 at the shaft end 184. The external spline is mated with an internal spline 204 within the inner diameter 202 of the pinion gear 200. In the alternative, dual keys or a separate gear may be secured to the shaft second end 184 to engage the inner diameter 202 of the pinion gear 200 while at the same time permitting relative longitudinal displacement between the shaft 180 and the pinion gear 200. The length of the internal spline 204 may extend along the entire length of the pinion inner diameter 202; however, it is necessary for the internal spline 204 to contact the external spline 195 on shaft 180 when the shaft 180 is rotated to provide rotation to the spindle 130 and thereby provide rotation to the toolholder 127 and the cutting element 25.

The toolholder 127 is secured to the spindle 130 and the spindle 130 is rotatably mounted within a second bore 225 along a second axis 230 extending through the housing 135. For reasons to be explained, the spindle 130 is comprised of a spindle front segment 235 and a spindle rear segment 240 with bearings 245 and bearings 250 permitting rotation of the respective spindle segments within the bore 225. A driven gear 220 is secured to the spindle front segment 235 such that rotation of the driven gear 220 causes rotation of the spindle front segment 235 and spindle rear segment 240.

The spindle 130 is designed in conjunction with the toolholder 127 and the toolholder shank 260 such that the toolholder 127 is releasably secured within the spindle 130 by translational motion along the second axis 230. The mechanism used within spindle 130 will be described, however, it should be appreciated that the spindle 130, or another anchor to which the toolholder 127 may be releasably secured along the second axis 230, are commercially available. Two such arrangements may be found in U.S. Pat. No. 4,708,040 entitled "Lock Rod and Apparatus for Holding a Toolholder" by Robert A. Erickson issued Nov. 24, 1987 and U.S. Pat. No. 4,747,735 entitled "Toolholder and Method of Releasably Mounting" by Robert A. Erickson, et al issued May 31, 1988, which are both assigned to the present assignee and incorporated by reference into this application.

For the spindle 130 shown in FIG. 3, a lock rod 265 having depressions 270 toward one end is secured to the spindle rear segment 240. The lock rod 265 may be secured by means of a screw 275 or other conventional means. The toolholder shank 260 has perforations 280 such that when the toolholder 127 is inserted into the spindle 130 and the lock rod 265 is moved along the second axis 230 away from the toolholder 127. In this manner locking elements 285 which had been resting within the depressions 270 are urged outwardly to engage with abutment surfaces 267 of the perforations 280. A guide 290 is secured within the spindle front segment 235 and passgeways 295 through the guide 290 provide guidance to the locking elements 285. As shown in FIG. 3, the locking elements 285 may be spheres.

As mentioned earlier, the spindle 130 is comprised of a spindle front segment 235 and a spindle rear segment 240. While the driven gear 220 rotates the spindle front segment 235, the spindle rear segment 240 is slidingly attached to the spindle front segment 235 through interdigitated fingers 300 and 305 extending from the front segment 235 and the rear segment 240 respectively. These interdigitated fingers interlock with one another thereby permitting a relative sliding motion between the front segment 235 and the rear segment 240 but providing rotational rigidity between the segments.

The rear segment 240 has a rear segment collar 310. A spring 315 is positioned around the spindle 130 such that the spring 315 is between the rear segment collar 310 and the driven gear 220. In this manner, the spindle rear segment 240 is urged away from the spindle front segment 235. When this occurs, the lock rod 265 is also urged away from the guide 290 and as a result, the locking elements 285 are displaced from depressions 270. The lock rod 265 then urges the locking elements 285 against the abutment surface 282 within the perforations 280. With this motion, the toolholder 127 and toolholder shank 260 are secured within the spindle 130. The arrangement within the spindle of the toolholder shank 260 with the perforations 280 and abutment surface 267, coupled with the lock rod 265 and the depression 270, interact with the locking elements 285 to form what will be referred to as the translational tool release mechanism.

The arrangement shown in FIG. 3 is a configuration whereby the shaft 180 may be rotated and this rotation will be transmitted to the pinion gear 200 and then to the driven gear 220 which will rotate the spindle 130 to rotate the toolholder 127, thereby rotating the cutting element 25. However, as shown in FIG. 4, in order to change toolholder 127 it is necessary to release the toolholder shank 260 from the spindle 130. To do this, lock rod 265 must be advanced toward the toolholder 127 such that the locking elements 285 are permitted to retract within depressions 270 thereby providing adequate clearance for the toolholder shank 260 to be removed from the spindle 130. Essentially, this is accomplished by advancing the spindle rear segment 240 toward the spindle front segment 235 to advance the lock rod 265 thereby releasing the toolholder shank 260.

As can be seen, in order to activate the translational tool release mechanism within the spindle 130, it is necessary to displace the spindle rear segment 240 along the second axis 230 toward the toolholder 127.

This is accomplished through a means for transmitting translation of the sleeve 150 to translation along the second axis 230. Specifically, as mentioned before and as illustrated in FIG. 4, the sleeve 150 has a ramped surface 165 which contacts an interface member 170. The interface member 170 interacts with a translation conveyor means 340 which may be comprised of a series of adjacent spheres 345 guided within a channel 350 in the housing 135. The spheres 345 are directed through the channel 350 such that displacement of the spheres 345 act to displace the spindle rear segment 240. A plug 355 having a convex cap 360 is secured to the spindle rear segment 240 to interact with an end sphere 347 which is displaced by other spheres 345. A lubricant may be applied to the spheres 345 and channel 350 to minimize friction between spheres and between the spheres and the channel.

It should be appreciated that the convex cap 360 of the plug 355 interacts with the sphere 347 only when the translation conveyor means 340 exerts a force upon the cap 360 to release or receive a toolholder 127 into the spindle 130. At other times, the sphere 347 or another contact member will not exert a significant force upon the convex cap 360. It should further be appreciated that the mating surfaces between the translation conveyor means 340 and the translational tool release mechanism should not be limited to circular elements and that other configurations are possible.

FIG. 4 illustrates the arrangement in which the toolholder 127 may be released from the spindle 130. The turret lathe disk 20 must be rotated such that the axis 65 of the pusher 60 (as shown in FIG. 2) must be aligned with the first axis 145 in FIG. 4. The pusher 60 is advanced along the first axis 145 thereby advancing the shaft 180 along the first axis and simultaneously advancing the sleeve 150 along the first axis 145. The ramped surface 165 of the sleeve 150 engages the interface member 170 and provides off axis translation for the translation conveyor means comprised of a series of spheres 345 and 347 within the channel 350. The end sphere 347 acts upon the convex cap 360 of the plug 355 to displace the spindle rear segment 240 along the second axis 230. In such a manner as described earlier, the locking elements 285 may then fall into the depression 270 of the lock rod 265 to provide adequate clearance for the toolholder shank 260 to be removed from the spindle 130. It can be seen from FIG. 4 that in order to do this, the force of the spring 315 must be overcome.

Once the toolholder shank 260 has been removed from the spindle 130 another type of toolholder having a similar shank 260 may be inserted into the spindle 130. With the toolholder 127 in place, the pusher 60 may be retracted. At this time the spring 315 will urge the spindle rear segment 240 away from the spindle front segment 235 thereby retracting the lock rod 265 within the spindle and causing the tool release mechanism to lock the toolholder shank 260 within the spindle 130.

When the spindle rear segment 240 is displaced, then the spheres 345 will also be displaced and act upon the interface member 170, applying a force to the ramped surface 165 of the sleeve 150 and urging the sleeve to the original position as shown in FIG. 3. In order to assist the sleeve 150 in returning to the original position, spring 170 exerts a force upon the sleeve 150. As can be seen in FIG. 3, once the pusher 60 is retracted, the tool shank 260 is secured within the spindle 130 such that the shaft 180 may be rotated and, through the drive train described previously, the toolholder 127 and the cutting element 125 will be rotated.

It should be noted that when the pusher 60 displaces the shaft 180 along the first axis 145, the gear 195 on the shaft 180 slides within the pinion internal spline 204.

Figure 5:
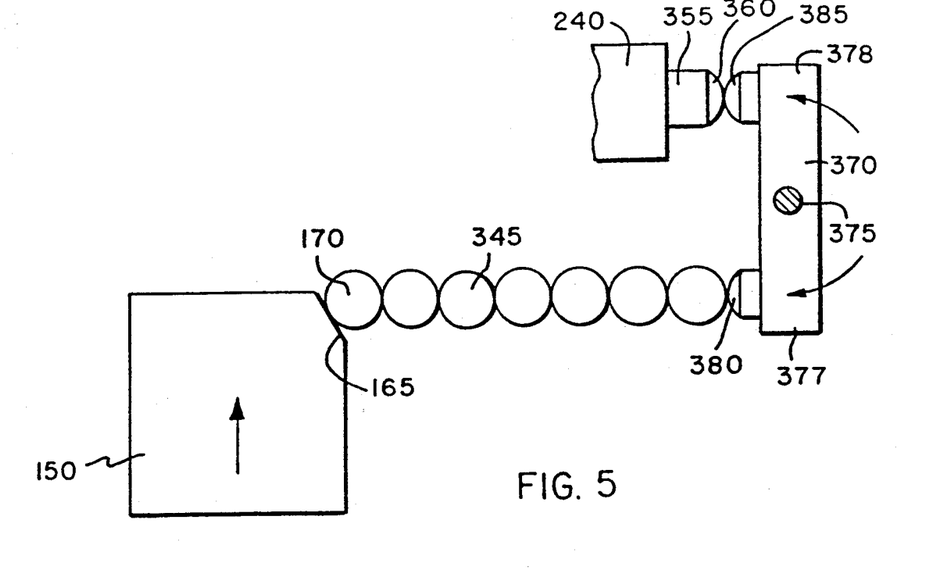
FIG. 5 shows a schematic of an alternative embodiment of the translation conveyor means in which translation to the tool release mechanism occurs using a pivot arrangement.

The translation conveyor means 340 illustrated in FIGS. 3 and 4 may be substituted by other embodiments. One such embodiment is shown in FIG. 5. In lieu of a series of spheres 345 within a channel 350, as shown in FIGS. 3 and 4, to further minimize friction that may be caused by interaction of the spheres within the channel, FIG. 5 shows the sleeve 150 with the ramped surface 165 contacting the interface member 170. However, the interface member 170 contacts a series of spheres aligned essentially along a straight line, thereby minimizing friction caused by rotation between spheres 345. A pivot 370 is mounted within the housing (not shown) about a fulcrum 375.

The spheres 345 act upon one end 377 of the pivot 370 thereby causing the other end 378 of the pivot 370 to displace in an opposite direction. This displacement then acts upon the convex cap 360 of the plug 355 connected to the spindle rear segment 240 and provides similar displacement to that provided by the arrangement in FIGS. 3 and 4. Convex cap 380 and 385 may be placed at the end 377 and end 378 of the pivot respectively for interaction with the spheres 345 and the convex cap 360 of the plug 355.

Figure 6:
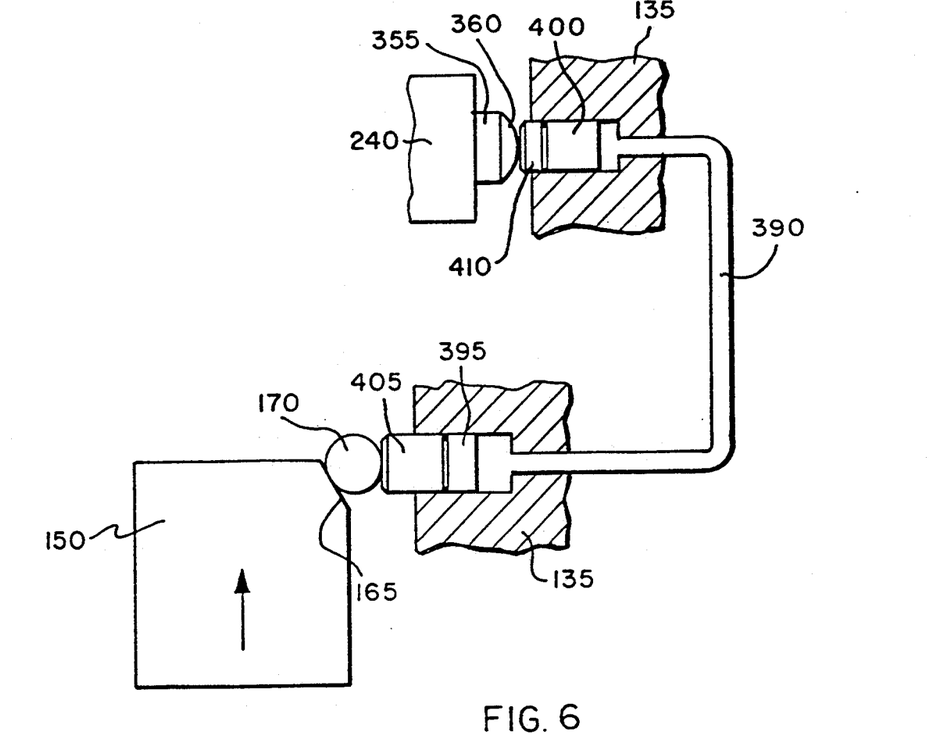
FIG. 6 shows a schematic of an alternative embodiment of the translation conveyor means utilizing a fluid filled enclosure to convey translation to the tool release mechanism.

Another embodiment for the translation conveyor means is shown in FIG. 6. Once again, the sleeve 150 has a ramped surface 165 which engages an interface member 170 to provide translational motion. However, in this instance, a sealed fluid filled line 390 is secured to the housing 135. The line 390 has a sliding piston 395 and 400 at each end with sliding piston 395 approximately aligned with the guided interface member 170 and sliding piston 400 approximately aligned with the convex cap 360 of the plug 355 which is connected to the spindle rear segment 240. Caps 405 and 410 may exist between piston 395 and interface member 170 and between piston 400 and convex cap 360.

Just as before, as the sleeve 150 is advanced the interface member 170 is translated in a direction away from the movement of the sleeve 150. The interface member 170 pushes the cap 405 against the piston 395 which displaces fluid within the line 390. The fluid within the line 390 acts upon the piston 400 which presses the cap 410 which acts against the convex cap 360 to displace the plug 355 and the spindle rear segment 240. With this embodiment the use of spheres may be eliminated. However, if desired, the interface member 170 may still be a sphere.

It should be appreciated that throughout, the interface member 170 has been presented as a sphere. As long as the interface member 170 may be effectively displaced by the ramp surface 165 to provide the necessary translation, there is no requirement that the interface member 170 be spherical.

Changes and modifications in the specifically described embodiments can be carried out without departing from the scope of the invention which is intended to be limited by the scope of the appended claims.

What is claimed is:

1. An apparatus for transmitting rotation about and translation along a first axis from a driver to a toolholder within a spindle positioned along a second axis which is non-parallel to the first axis and having a toolholder translational locking mechanism, the apparatus comprising:

a) a housing having a first bore along the first axis and a second bore along the second axis, wherein the second bore is adapted to receive the spindle;

b) a sleeve having a first and second end and the sleeve slidingly mounted for translation along the first axis within the first bore;

c) means for transmitting translation of the sleeve to translation along the second axis for operating the toolholder translational locking mechanism;

d) a shaft having a first and second end rotationally mounted within the sleeve; and e) means for transmitting rotation of the shaft about the first axis to rotation about the second axis of rotating the spindle thereby rotating the toolholder.

2. The apparatus according to claim 1 wherein the means for transmitting translation of the sleeve is comprised of a ramped surface within and secured to the housing oriented away from the first axis and an interface member within the housing which when moved by the sleeve second end engages the ramped surface and is guided away from the first axis to provide translation to a translation conveyor means which acts upon the toolholder locking mechanism of the spindle.

3. The apparatus according to claim 2 wherein the ramped surface forms an angle with a translational axis within the housing of approximately between 50 and 60 degrees.

4. The apparatus according to claim 3 wherein the ramped surface forms an angle with the translational axis within the housing of approximately 55 degrees.

5. The apparatus according to claim 2 wherein the interface member is a sphere.

6. The apparatus according to claim 1 wherein the sleeve includes a ramped surface at the sleeve second end oriented away from the second axis and wherein the means for transmitting translation of the sleeve is comprised of an interface member guided within the housing away from the first axis and capable of being engaged with the sleeve ramped surface to provide translation to a translation conveyor means which acts upon the toolholder locking mechanism of the toolholder.

7. The apparatus according to claim 6 wherein the ramped surface forms an angle with a translational axis within the housing of approximately between 50 and 60 degrees.

8. The apparatus according to claim 7 wherein the ramped surface forms an angle with the translational axis within the housing of approximately 55 degrees.

9. The apparatus according to claim 6 wherein the interface member is a sphere.

10. The apparatus according to claim 6 wherein the translation conveyor means is a series of adjacent spheres captured and guided within a channel in the housing, the channel approximately aligned with the guided interface member at one end and with the toolholder locking mechanism at the other end, such that the translation of the sleeve is transmitted to translation at the toolholder locking mechanism.

11. The apparatus according to claim 10 wherein the means for transmitting rotation of the shaft about the first axis to rotation about the second axis to rotate the spindle and the cutting element is comprised of a) an external spline about the second end of the shaft;

b) a pinion gear rotationally mounted within the housing along the first axis near the second end of the shaft, the pinion gear having an inner diameter with an internal spline to slidingly receive the external spline; and c) a driven gear secured to the spindle along the second axis and engaged with the pinion gear such that rotation of the pinion gear will cause rotation of the spindle and cutting element.

12. The apparatus according to claim 6 wherein the translational conveyor means is a series of adjacent spheres captured and guided within a channel in the housing, the channel approximately aligned with the guided interface member at one channel end and with one end of a pivoting arm mounted within the housing at the other channel end, with the other end of the pivoting arm being approximately aligned with the toolholder translational locking mechanism, such that translation of the sleeve is transmitted to translation at the toolholder locking mechanism.

13. The apparatus according to claim 12 wherein the means for transmitting rotation of the shaft about the first axis to rotation about the second axis for rotating the spindle thereby rotating the cutting element is comprised of a) an external spline about the second end of the shaft;

b) a pinion gear rotationally mounted within the housing along the first axis near the second end of the shaft, the pinion gear having an inner diameter with an internal spline to slidingly receive the external spline; and c) a driven gear secured to the spindle along the second axis and engaged with the pinion gear such that rotation of the pinion gear will cause rotation of the spindle and cutting element.

14. The apparatus according to claim 6 wherein the translational conveyor means is a sealed fluid filled line secured to the housing, the line having sliding pistons at each end with one piston approximately aligned with the guided interface member and the other piston approximately aligned with the tool release, such that translation of the sleeve is transmitted to translation at the toolholder locking mechanism.

15. The apparatus according to claim 14 wherein the means for transmitting rotation of the shaft about the first axis to rotation about the second axis for rotating the spindle thereby rotating the driven tool is comprised of a) an external spline about the second end of the shaft;

b) a pinion gear rotationally mounted within the housing along the first axis near the second end of the shaft, the pinion gear having an inner diameter with an internal spline to slidingly receive the external spline; and c) a driven gear secured to the spindle along the second axis and engaged with the pinion gear such that rotation of the pinion gear will cause rotation of the spindle and cutting element.

16. An apparatus for transmitting rotation about and translation along a first axis from a driver to a toolholder within a spindle positioned along a second axis and having a toolholder translational locking mechanism, the apparatus comprising:

a) a housing having a first bore along the first axis and a second bore along the second axis, wherein the second bore is adapted to receive the spindle;

b) a sleeve having a first and second end and the sleeve slidingly mounted for translation along the first axis within the first bore, the sleeve further including a ramped surface at the sleeve second end oriented away from the first axis for displacing an interface member along a translational axis;

c) means for transmitting translation of the sleeve to translation along the second axis for operating the toolholder translational locking mechanism comprised of an interface member guided within the housing away from the first axis and capable of being engaged with the sleeve ramped surface to provide translation to a translation conveyor means which acts upon the toolholder locking mechanism of the toolholder and furthermore wherein the ramped surface forms an angle with the translational axis within the housing of approximately between 50 and 60 degrees.

d) a shaft having a first and second end rotationally mounted within the sleeve; and e) means for transmitting rotation of the shaft about the first axis to rotation about the second axis for rotating the spindle thereby rotating the toolholder comprised of i) an external spline about the second end of the shaft;

ii) a pinion gear rotationally mounted within the housing along the first axis near the second end of the shaft, the pinion gear having an inner diameter with an internal spline to slidingly receive the external spline; and iii) a driven gear secured to the spindle along the second axis and engaged with the pinion gear such that rotation of the pinion gear will cause rotation of the spindle and cutting element.

* * * * *